United States Patent [19]

Girardin

[11] Patent Number: 5,786,557
[45] Date of Patent: Jul. 28, 1998

[54] ELECTROEROSION MACHINE WITH A FRAME WITH A NEW STRUCTURE

[75] Inventor: Roger Girardin, Vernier, Switzerland

[73] Assignee: Charmilles Technologies S.A., Switzerland

[21] Appl. No.: 577,650

[22] Filed: Dec. 22, 1995

Related U.S. Application Data

[63] Continuation-in-part of Ser. No. 304,796, Sep. 12, 1994, abandoned.

[30] Foreign Application Priority Data

Oct. 9, 1993 [CH] Switzerland ............... 02 715/93-2

[51] Int. Cl.[6] ............................................. B23H 1/00
[52] U.S. Cl. ................................................. 219/69.11
[58] Field of Search ..................... 219/69.11, 69.14, 219/69.2

[56] References Cited

U.S. PATENT DOCUMENTS

| | | | |
|---|---|---|---|
| 2,981,822 | 4/1961 | Larkins, Jr. | 219/69.14 |
| 3,590,210 | 6/1971 | O'Connor | 219/69.14 |
| 4,597,698 | 7/1986 | Liebetrau | 409/134 |
| 4,749,838 | 6/1988 | Lodetti et al. | |
| 4,755,651 | 7/1988 | Tsutsui et al. | 219/69.14 |
| 5,086,203 | 2/1992 | Kobayashi et al. | |
| 5,152,645 | 10/1992 | Corsi | |
| 5,264,676 | 11/1993 | Kanaya et al. | 219/69.11 |
| 5,293,022 | 3/1994 | Onandia-Alberdi | |
| 5,391,850 | 2/1995 | Mueller | 219/69.2 |

FOREIGN PATENT DOCUMENTS

| | | |
|---|---|---|
| 2509643 | 1/1983 | France . |
| 3404869 | 8/1985 | Germany . |
| 61-173814 | 8/1986 | Japan .......... 219/69.11 |
| 624519 | 1/1987 | Japan . |
| 624524 | 1/1987 | Japan . |
| 3169221 | 7/1988 | Japan . |
| 1289196 | 9/1972 | United Kingdom . |
| 2138596 | 10/1984 | United Kingdom . |
| 2169835 | 7/1986 | United Kingdom . |

Primary Examiner—Geoffrey S. Evans
Attorney, Agent, or Firm—Gifford, Krass, Groh, Sprinkle, Patmore, Anderson & Citkowski, P.C.

[57] ABSTRACT

EDM machine for machining of a stationary workpiece including a device for moving the machining head of the machine and hence the tool along the Z axis and a cross movements system with two chariots each sliding along one of the reference axes X and Y of the machine for moving the machining head along these axes. A main frame body is shaped as a cube having four vertical walls joined together so as to delimit a square space all these walls being immovably attached to the same base forming the lower face of the cube and to the horizontal element with an opening cut out in it forming the upper face of the cube. An assembly designed to move the machining head along the Z axis along at least one of the chariots of the system in the X-axis and/or Y-axis of cross movements is mounted above the upper face of the cube thus resting on four pillars formed by the edges of the cube delimited by the four vertical walls. The opening cut out in the upper face of the cube being suitably profiled to allow this assembly to move freely along at least either the X or Y axis. The machining tank and the work table are mounted atop a vertically actuable column extending from a base of the body during machining.

8 Claims, 2 Drawing Sheets

ELECTROEROSION MACHINE WITH A FRAME WITH A NEW STRUCTURE

This is a Continuation-in-part of application Ser. No. 08/304,796 filed on Sep. 12, 1994, now abandoned.

BACKGROUND OF THE INVENTION AND DESCRIPTION OF THE PRIOR ART

This invention concerns the structure of an electrical discharge machining (EDM) machine. In particular, an EDM milling machine. This technique consists of the following: a three-dimensional cavity or solid form is machined by hollowing out the workpiece-electrode, preferably at high speed, with a rotary tool-electrode, of a shape that is simple and independent of the desired contour. This saves the fastidious work of designing and making electrodes of complex shapes. It is possible to proceed by successive slices and by compensating the wear of the tool-electrode according to the method described in application (E. 224) or EP 555,818 by the applicant.

Japanese patent (JP 62-4524A) teaches an electrical discharge machine in which a workpiece is mounted to a workbed submerged within a work tank. A superstructure extends above the workbed and includes first and second carriages for creating reciprocating movement along first and second horizontal axes. A motor is provided for driving the entire superstructure in a vertical direction. According to a further preferred embodiment, the work bed is vertically and movably supported above the floor of the work tank by heavy duty column extending upwardly from a side of the machine.

The shortcoming of the Japanese reference is that it is cumbersome in size and use and does not provide a means for actuating a downwardly extending machine shaft and tool along a vertical direction without also having to support the weight of the first and second horizontal actuators. Furthermore, the Japanese reference is directed primarily toward a machine in which the workpiece may be easily exchanged and does not take into account the need for three dimensional mobility necessary for more modern high speed machining operations.

U.S. Pat. No. 5,152,645, issued to Corsi, teaches a cabin machine tool having a rectangular shaped structure with openings in each side for permitting access into an interior work zone. A platen is mounted to a base of the work zone and is movable in a first horizontal direction. A vertically extending member is slidably mounted along a second horizontal direction to a top of the cabin structure and further is capable of a limited vertical actuation.

While providing an effective machine tool for realizing three dimensional models, Corsi is not well suited for high speed and high wear EDM machining operations in which a transfer mechanism must provide two different horizontal motions in addition to a downwardly extending shaft having a vertical motion. Corsi further does not teach mounting a work table upon its base which is capable of an additional vertical motion to correspond with the motions of the overhead member.

Machining is done with a high wear rate, in which the length of the tool-electrode of simple shape goes down rapidly, but without any apparent lateral wear. The geometry of the three-dimensional volume to be hollowed out has been memorized in the form of a set of virtually parallel superimposed layers (or slices). The active end of the tool-electrode makes reciprocal or other movements in the plane of each of these slices, so as to erode them successively down to the bottom of the cavity to be machined. The active end advances along a plane tool path called "at zero wear," whose X and Y axis coordinates have also been memorized.

As in EDM die sinking, contouring or drilling, the tool is gripped in a tool holder locked on to a rotary machining head that is mobile along the Z axis, while the workpiece is placed on and clamped to a work table stationary or not in relation to the main frame of the machine. The relative movement (X, Y movement) between the machining head (and the tool) and the workpiece is obtained in general thanks to a system of crossed movements.

EDM machines known at present have a wide range of variants:

the head is stationary in relation to the X and Y axes and the assembly that moves is the workpiece and its work table, mounted on a system having crossed movements along the X and Y axes;

the workpiece and its work table are stationary and it is the unit that is mobile along the Z axis, on which is fixed the machining head and the components providing tool rotation, which is actuated by a system having crossed movements along the X and Y axes;

the head moves for example along the X axis, along the pediment of a gantry mounted on the base, on both sides of the working area; it is the gantry or the workpiece and its work table which moves along the Y axis. These variants correspond to the two known types of structure used for EDM machines: column or ("C") and gantry. In both cases the main frame has a base that supports the work tank.

In the C structure, a vertical column is fixed rigidly to this base, and a console is mounted with overhang on this column. The console carries the chariot which is mobile along Z and on which is fixed the machining head and the components providing rotation of the tool. The cross-slide systems along the X and Y axes generally rests on the base, under the work tank (it is the workpiece which is mobile); this system can also be incorporated into the column (only the machining head is mobile) either at the end of the mobile chariot holding the machining head or at the point where it is attached to the column.

In the gantry structure, two columns or shoulders rise on both sides of the base and are rigidly fixed to a cross beam on which is mounted the chariot mobile along Z, on which the machining head and the components providing rotation of the tool are fixed, the latter being placed over the machining area and the work tank. In general this chariot is also mobile along the cross beam, along the X axis. Either the workpiece or the gantry is mobile along the Y axis, so as to bring the workpiece under the machining head.

These two types are also found in EDM wire cutting. It is well known that a gantry construction is more rigid, more stable, and less sensitive to vibrations than the C type structure. But the disadvantage of the gantry structure is that the workpiece is much less accessible compared to a C type machine. This is why gantry type machines usually have a gantry that is mobile along the Y axis so as to offset the work table, carrying the workpiece and its clamping system, in relation to the pillars of the gantry.

SUMMARY OF THE PRESENT INVENTION

Contrary to conventional EDM die sinking techniques (die sinking, planetary die sinking, drilling, contouring), EDM milling is generally carried out with a current of very high density (sometimes one or several hundred amperes/ cm²), and with very high rotation speeds of the tool-electrode (one or several thousand r.p.m.). On the other hand, the tool is generally a small-diameter cylinder that can be hollow, so it is very light compared to the tools normally used in conventional die sinking. Moreover, the active end of the tool-electrode moves with a reciprocating or spiral movement in the plane of each of the eroded layers, hence with sudden changes of direction. Finally, to be able to machine without apparent lateral wear, a very high rate of wear is used (for example 20 to 50%); advance speeds along the tool paths are much higher than in planetary die sinking or contouring, for instance; they can be around 10 mm/sec. It should also be noted that the heat given off is greater. The constraints are therefore not the same as in conventional die sinking and may sometimes be more like those found in EDM wire cutting or in EDM drilling.

Contrary to the tradition followed to date in EDM, according to which an EDM machine must be of either one of these structures, the new structure according to this invention is neither a column type machine, nor strictly speaking a gantry machine. It is an EDM machine of a new type, designed to machine a stationary workpiece-electrode (fixed in relation to the main frame); its main frame forms a cube delimited by four vertical walls at least some of which are widely cut out so as to make the work area accessible; these walls are immovably attached both to a single base forming the lower face of the cube, and to the horizontal element with an opening cut out in it, forming the upper face of the cube; this upper face supports the assembly constituted by at least one of the chariots sliding along the reference axes X and Y and the device for moving the machining head along the Z axis.

This invention was developed by the applicant in connection with EDM milling by layers, but can also very advantageously be used for other types of machining where there is a need for a good mastery of tool movements, stability and compactness of the main frame and good accessibility of the machining area.

The new open cube structure according to this invention is even more stable than known gantry structures, in particular due to the fact that the masses in movement rest on four points of support instead of two and that these points are all immovably attached to the same single base; all overhang is avoided; the machine absorbs better the vibrations caused by the high rotation speed of the electrode; accuracy and reliability of machining are improved, as is user comfort, since noise is virtually eliminated, despite the high rotation speeds used.

A machine having such a symmetrical structure has better resistance to thermal distortions; if they do occur they are symmetrical and thus less likely to affect accuracy; the temperature variations of the dielectric bath contained in the work tank are also no longer transmitted unequally to the main frame of the machine which becomes uncontrollably distorted, but on the contrary are transmitted symmetrically to the main frame and hence to the components of the machine. Furthermore, since at least two of the mechanisms actuating the machining head along the three reference axes X, Y and Z are laid out "on the roof" of the main frame and hence far from the machining area, they are much less affected by the heat given off in the area.

Preference should be given to the use of materials with good thermal stability, such as certain polymer concretes, in particular those based on epoxy resins or ceramic powders for the main frame, Kevlar for example for the machining tank, and ceramics for the system of crossed X and Y movements.

The fact that the workpiece and the tank are fixed eliminates all problems of dielectric overflowing from the work tank when there are rapid relative movements and above all accelerations along X, Y, which are usual in EDM milling. But above all, as for every machine with a fixed workpiece, machining accuracy and reproducibility is practically independent of the workpiece dimensions and weight.

Above mentioned two first advantages are further accentuated in the case of the variant consisting of a monobloc structure or a structure in which the assembly of the means for moving the machining head along the reference axes X, Y and Z also has a symmetrical structure such as that described in applicant's parallel patent application U.S. Ser. No. 08/304,795, now abandoned, having priority of application Ser. No. 2 715/93-2 filed on Sep. 10, 1993 in Switzerland; the device for moving the machining head along the Z axis is passing through the chariot of one of the two cross movements system each sliding along one of the reference axes X and Y of the machine for moving the machining head along these axes, both being mounted symmetrically on the upper face of the cubic frame of the invention.

It should also be added that a structure according to this invention with at least two of the mechanisms actuating the machining head along the three reference axis X, Y and Z mounted "on the roof" of the main frame, frees the zones around the machining area, since at least two sides are completely clear, thanks to the high position of the X and Y movements which are frequently bulky.

Another advantage is that the movements along X and Y are not limited by any lateral obstacle.

The structure according to this invention has a particularly advantageous variant, in which the Z movement mechanism crosses the two X and Y movement chariots mounted "on the roof" of the cubic frame. The Z axis is thus passing at the center of symmetry of one of these chariots, while it always maintains a point in common with the other axis. This arrangement further strengthens the symmetry of the machine, and above all reduces to the maximum the movements of inertia along the axis of movement, thus enhancing the advantages already mentioned above.

Furthermore, thanks to the wide openings cut out of the lateral faces of the cube and to a drop tank, the machining area remains very accessible. The base of the machine is no longer a caisson closed on all sides and with the work table above; the volume within the cube is very unencumbered and can advantageously be occupied for example by the components making up the dielectric circuit, and a changer/container for tools. All the space between the pillars or the edges of the cube, the work table and the machining head can be occupied by the workpiece.

In the following, the invention is described in greater detail by means of the drawing representing two of the forms of execution, given as non-exhaustive examples. The machine thus represented can receive any modifications of form and detail without departing from the spirit of the invention.

BRIEF DESCRIPTION OF THE DRAWING

Reference will now be made to the attached drawings when read in combination with the following specification wherein like reference numerals refer to like parts throughout the several views and in which.

DESCRIPTION OF THE PREFERRED EMBODIMENT

Figure 1:
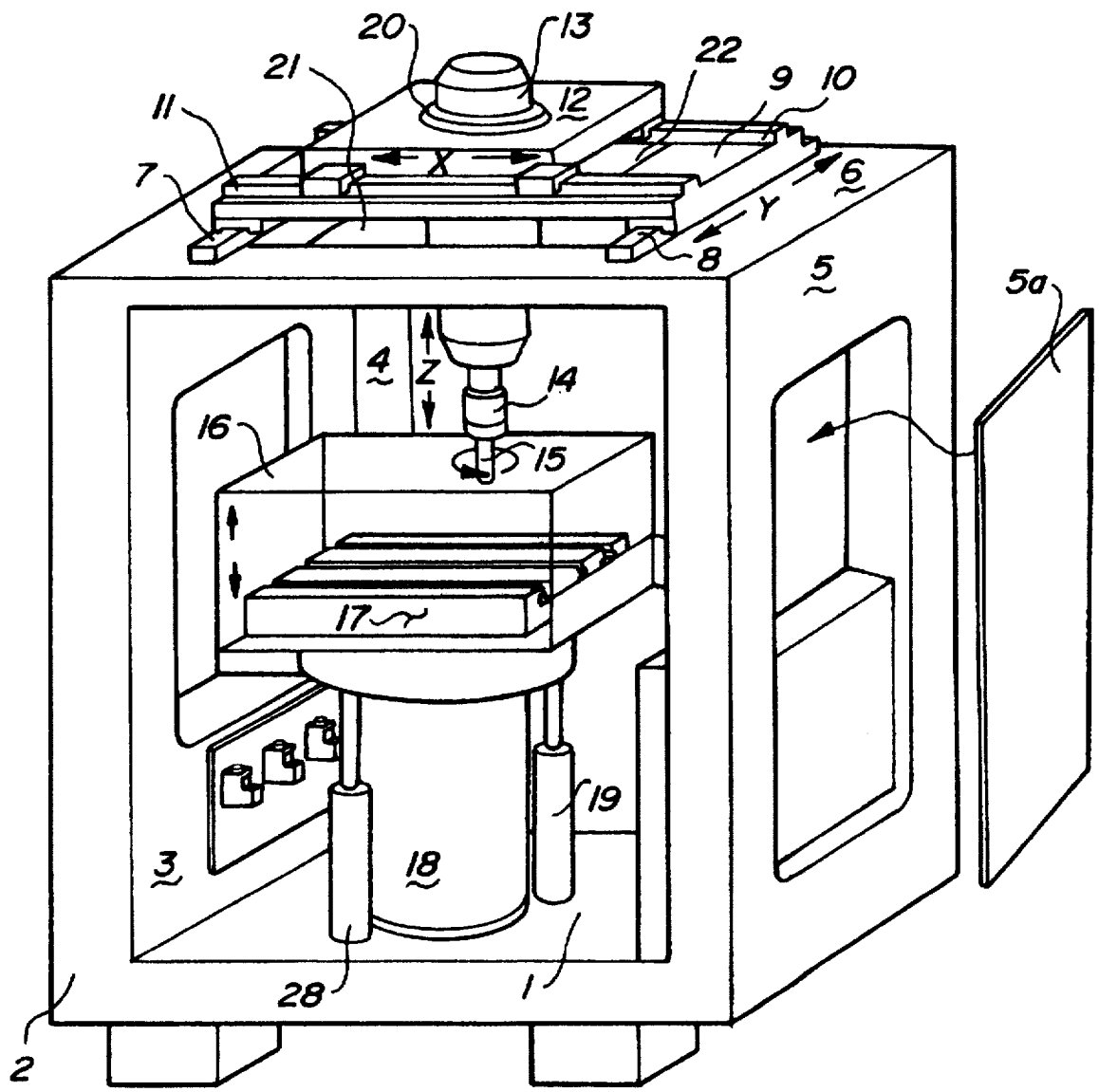
FIG. 1 is a view of the electrical discharge machine according to a first preferred embodiment.

FIG. 1 is a simplified perspective view of the front face and one side of the main frame of a machine according to this invention; this main frame is in the shape of a cube. Its base 1 is constituted by the lower face of this cube. The four sides 2 and 5 each made up of one of the lateral faces of this cube are cut out to a large extent while retaining, along the edges of the cube, four pillars on which the upper face 6 rests. The main frame may also be of any other polygonal shape such as a triangle pentagon hexagon etc., and may also be circular in shape, being a polygon having an infinite number of sides.

The upper face 6 has two rails 7 and 8 on which the chariot 9 slides, corresponding to the movement along the Y axis. This chariot 9 has two rails 10 and 11 on which the chariot 12 slides, corresponding to the movement along the X axis. This chariot 12 has a circle cut out and comprises the means 20 for holding the cylindrical shaft 13 of the movement along the Z axis. The face 6 and the chariot 9 both have a space, 21 and 22 respectively, suitably cut out to allow this shaft 13 to move freely along X and Y, following the movements of these chariots 9 and 12. These rails 7, 8, 10 and 11 are preferably prestressed, serving to guide the movement of slides of known type, mounted on the lower face of the chariots 9 and 12. These rails and slides are of great rigidity and allow accurate and reproducible machining.

A bellows (not shown) isolates the rotating spindle, mounted in the shaft 13, and therefore not visible in the drawing, from the machining liquid sprayed from the machining head to cool the machining area and evacuate the debris of EDM machining, and also from the vapors and fumes rising from the machining bath. This shaft 13 also contains the machining head and the components of the Z axis. This rotary spindle is equipped with the means for locking (not shown) the tool holder 14 gripping a tool 15. Movable protective panels, as illustrated by panel 5a for side 5, possibly transparent, can cover, in general during machining operations, the openings provided in the sides 2 and 5.

Thanks to the hydraulic or pneumatic systems 28 and 19 (the third, hidden by the column 18 is now shown), the work tank 16 can slide downwards along column 18; the latter supports a work table 17 designed to hold the workpiece (the workpiece and its clamping devices are not shown).

Figure 2:
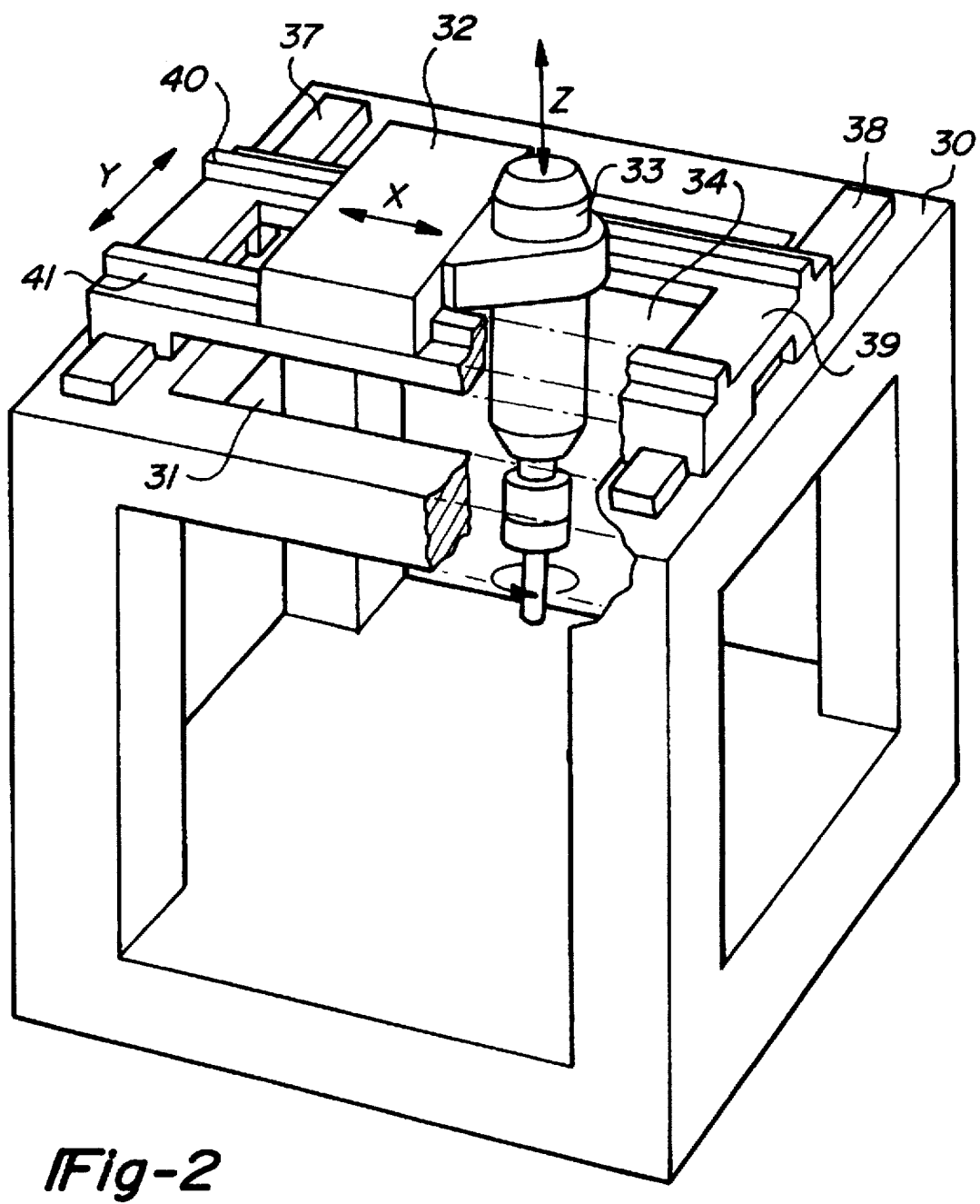
FIG. 2 is a view of the electrical discharge machine according to a second preferred embodiment.

FIG. 2 is a simplified perspective view of the front face and one side of the main frame of another machine according to another embodiment of this invention; the upper face 30 of the main frame is provided with rails 37 and 38 on which slides the chariot 39 along the axis Y. This chariot 39 is fitted with two rails 40 and 41 along which the chariot 32 slides along the axis X. This chariot 32 is provided on one of its lateral faces with means for holding the cylindrical shaft 33 of the movement along the Z axis. In contrast to the first preferred embodiment the shaft 33 no longer extends across the center of symmetry of the chariot 32. The face 30 and the chariot 39 both have a space, 31 and 34 respectively, suitably cut out to allow this shaft 33 to move freely along X and Y, following the movements of the chariots 39 and 32.

I claim:

1. An electrical discharge machine for machining a stations mounted workpiece, comprising:

a polygonal shaped body having a top, a bottom, and at least one side, said side fixing said top and said bottom in spaced non-movable, relationship, said top and at least one of said sides having an opening formed therethrough for permitting access into said body;

a first pair of guide rails mounted on and supported by said top above said opening and slidably supporting a first chariot positioned over said opening during reciprocating motion of said chariot in a first horizontal direction, said first chariot having an opening formed therethrough;

a second pair of parallel guide rails mounted on said first chariot above said opening in said first chariot and slidably supporting a second chariot above said opening in said first chariot, said second chariot being capable of reciprocating motion in a second horizontal direction perpendicular to said first horizontal direction;

said guide rails being vertically fixed with respect to said body whereby said chariots are movable only in horizontal directions;

a tool carrying machine shaft extending downwardly from said second chariot, through said openings in said first chariot and said top, and into said body, said shaft terminating in a tool and being capable of reciprocating motion in a third, vertical direction; and a column mounted to said base and means for upwardly and downwardly actuating said column along said vertical direction, a work table being supported atop said column and fixedly securing the workpiece;

said workpiece being movable in said vertical direction atop said column in coordination with said movements of said shaft and tool to permit machining of said workpiece.

2. The electrical discharge machine according to claim 1, said means for upwardly and downwardly actuating said column comprising a plurality of hydraulic lift cylinders extending upwardly from said base and engaging an underside of said column at different positions.

3. The electrical discharge machine according to claim 1, said means for upwardly and downwardly actuating said column comprising a plurality of pneumatic lift cylinders extending upwardly from said base and engaging an underside of said column at different positions.

4. The electrical discharge machine according to claim 1, further comprising a work tank supported atop said column, said work table with the workpiece being submersed within said work tank.

5. The electrical discharge machine according to claim 1, further comprising at least one detachable panel being mounted over said opening in said at least one body side.

6. The electrical discharge machine according to claim 5, wherein said at least one detachable panel is transparent.

7. The electrical discharge machine according to claim 1, said polygonal shaped body further comprising a cuboidal shape having a first side, a second side, a third side and a fourth side, each of said sides having an opening formed therethrough.

8. The electrical discharge machine according to claim 1, said tool being rotatably mounted to said shaft.

* * * * *

UNITED STATES PATENT AND TRADEMARK OFFICE
CERTIFICATE OF CORRECTION

PATENT NO. : 5,786,557
DATED : July 28, 1998
INVENTOR(S) : Girardin

It is certified that error appears in the above-identified patent and that said Letters Patent is hereby corrected as shown below:

Column 1, line 30, insert "a" after -- by --

Column 4, line 8, delete "Above" and insert -- The above --

Column 5, line 43, delete "now" and insert -- not --.

Column 5, lines 62 and 63, delete "stations" and insert --stationary--.

Signed and Sealed this

Sixteenth Day of February, 1999

Attest:

Attesting Officer

*Acting Commissioner of Patents and Trademarks*